March 19, 1929. P. G. EDWARDS ET AL 1,705,561
ELECTRICAL TESTING SYSTEM
Filed May 5, 1926

INVENTORS
P. G. Edwards and H. W. Herrington
BY
ATTORNEY

Patented Mar. 19, 1929.

1,705,561

UNITED STATES PATENT OFFICE.

PAUL G. EDWARDS, OF BROOKLYN, NEW YORK, AND HAROLD W. HERRINGTON, OF UPPER MONTCLAIR, NEW JERSEY, ASSIGNORS TO AMERICAN TELEPHONE AND TELEGRAPH COMPANY, A CORPORATION OF NEW YORK.

ELECTRICAL TESTING SYSTEM.

Application filed May 5, 1926. Serial No. 106,993.

This invention relates generally to electrical testing systems, and particularly to systems for the determination and measurement of the electrical characteristics of circuits and apparatus.

An object of the invention is to provide a simple system for determining separately and independently the reactance and resistance components of any impedance.

In this invention there is employed a Wheatstone bridge having known and unknown elements, and a current detecting device such as a galvanometer, having a fixed coil and a movable coil, these being arranged so as to measure and determine the characteristics of the unknown elements. The movable coil of the current detecting device is adapted to be energized when there is an unbalanced condition in the bridge so that an indication is made of this unbalanced condition. The movable coil is supplied with alternating current which is alternately in phase or in quadrature with the current supplied to one diagonal of the Wheatstone bridge, and the fixed coil is energized by current having a predetermined phase relationship with the currents supplied to the diagonal of the bridge. The bridge is supplied from a source having output brushes so arranged as to transmit currents to the bridge in quadrature with each other. A switch is included in the circuit for connecting one or another pair of output brushes to the bridge. In this arrangement two or three trials are necessary to obtain a good balance. Each trial gives a closer approximation.

By the arrangements of this invention it is possible to balance quickly one arm of the bridge against another. By these balances the magnitudes of the components of any impedance may be obtained.

Figure 1:
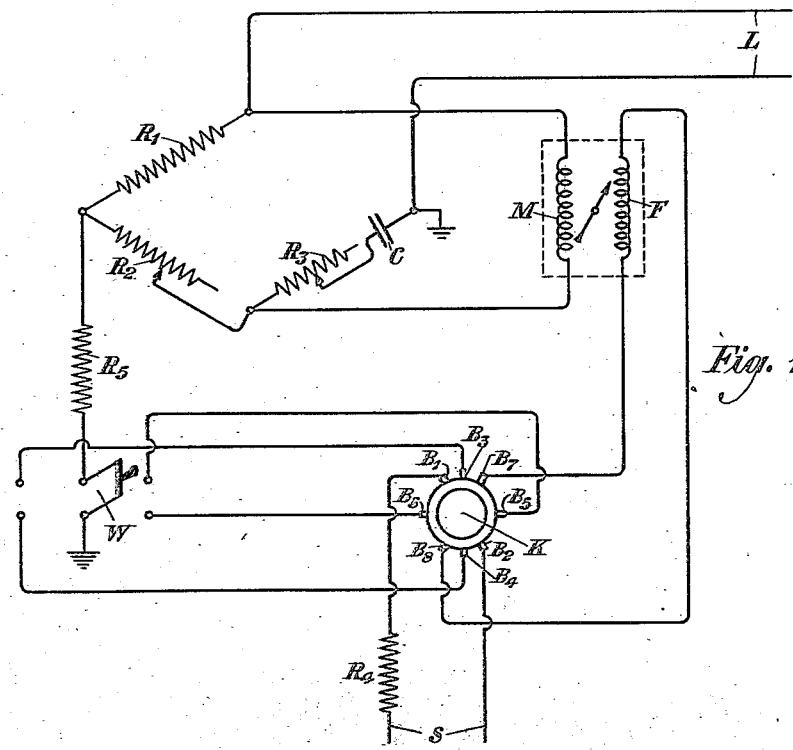
Figure 2:
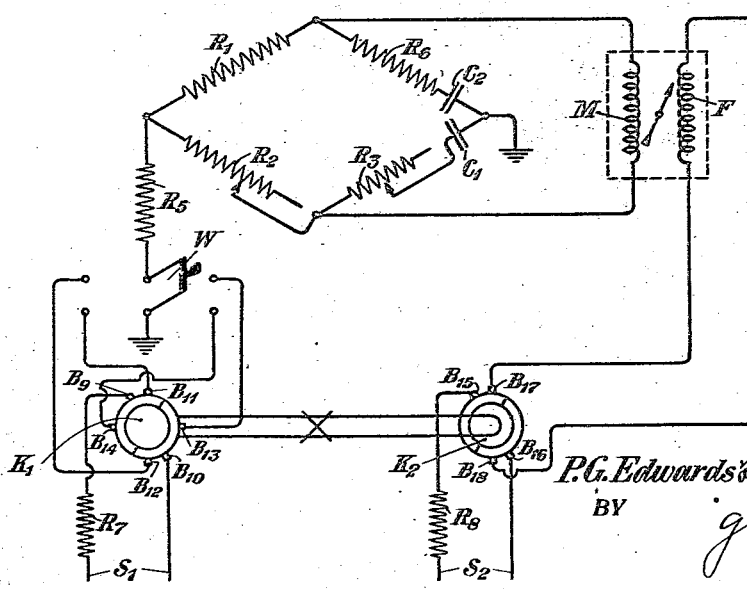

Other objects and advantages of the invention will be better understood from the detailed description hereinafter following when read in connection with the accompanying drawing showing two embodiments of the invention, in which Figure 1 shows a rotatable commutator associated with a Wheatstone bridge having a telephone line as one of its arms for determining the reactance and resistance components of the telephone line, and Fig. 2 shows a modification of the invention in which the reactance and resistance components of any impedance may be determined.

Referring to Fig. 1 of the drawing, there is shown a Wheatstone bridge having a telephone line L as one arm thereof; another arm of the bridge includes a fixed resistance $R_1$ of known magnitude; a third arm of the bridge includes an adjustable resistance $R_2$; and the fourth arm of the bridge includes a fixed condenser C of known magnitude in series with an adjustable resistance $R_3$. It is the object of the invention to obtain a balance of the resistance $R_2$ against the resistance $R_1$ which will be separate from and independent of the balance of the resistance $R_3$ in series with the capacity C against the telephone line L.

A current detecting device includes a movable coil M and a fixed coil F, the movable coil M being connected in one diagonal of the bridge. As is well known, a reading is obtained with such a device by reason of the reaction of one coil upon the other and will, therefore, indicate no current when either of the coils is unexcited, or when the currents through these coils are in quadrature. The fixed coil F is supplied with alternating current, as will be shown hereafter. When the bridge is balanced there will be no flow of current through the movable coil M, and the current detecting device will show that a balanced condition exists. However, there will be described herein arrangements for shifting the current flowing in the movable coil M from one phase to another phase 90 degrees away. By this shifting means it is possible to discriminate between a true balance, i. e., when there is an absence of current in the movable coil M, and a false balance, i. e., due to currents in the movable coil M and the fixed coil F whose phase relationship approaches quadrature, since it is well known that in a current detecting device of the type employed in this invention there is an indication of a balanced condition when currents flowing through the respective windings thereof are exactly 90 degrees apart.

The source of excitation for the bridge consists of a motor driven commutator K (motor not shown), which may be made to revolve at any desired speed, and which may therefore transmit current of any frequency, preferably a low frequency. The potential for the bridge is obtained from a unidirectional source S which is connected through a protective resistance $R_4$ to the input brushes $B_1$ and $B_2$ of the commutator K. The commutator K has three pairs of output brushes, $B_3$ and $B_4$, $B_5$ and $B_6$, $B_7$ and $B_8$, respectively, two pairs of these brushes, $B_3$ and $B_4$, $B_5$ and $B_6$, being in quadrature with each other. The latter pairs of brushes are wired to a diagonal of the bridge through a double-pole, double-throw switch W and a protective resistance $R_5$. By means of the switch W it is possible to shift from one pair of output brushes, $B_3$ and $B_4$, to another pair of output brushes, $B_5$ and $B_6$, these pairs of brushes being in quadrature, as stated above. The brushes $B_7$ and $B_8$ are so placed on the commutator K that for one position of the switch W the current flowing through the fixed coil F of the current detecting device, which is connected to these brushes, is in phase with the current flowing through the adjustable resistance $R_2$ in one arm of the bridge. Under this condition the current detecting device will be sensitive to changes in the resistance $R_2$ and comparatively insensitive to changes in the resistance $R_3$. Consequently, in determining the capacity reactance of the telephone line L (which has a large reactance component and a comparatively small resistance component) the resistance $R_3$ may be at first shunted and an approximate balance will be, nevertheless, indicated by the current detecting device.

After a preliminary adjustment has been made between resistance $R_1$ and $R_2$, the switch W is moved to connect the other pair of output brushes to the diagonal of the bridge. Now, the current detecting device will be sensitive to changes in the resistance $R_3$, by virtue of the fact that current through the fixed coil F is substantially in phase with the current in the movable coil M, current flowing in the movable coil M due to any unbalance of resistance $R_3$. By adjusting the resistance $R_3$ a balanced condition is again indicated on the current detecting device. The switch W is then moved to connect the pair of output brushes previously connected to the diagonal of the bridge and the resistance $R_2$ is balanced against the resistance $R_1$. This operation may continue for two or three trials, notwithstanding, however, that when the bridge is absolutely balanced the current detecting device will indicate it regardless of which pair of output brushes is connected to the diagonal of the bridge. In practice, not more than two or three trials will be necessary.

When a true balance is obtained the reactance component of the telephone line L will bear the same ratio to the reactance of the condenser C that the resistance $R_1$ bears to the resistance $R_2$. Also, the resistance component of the telephone line L will bear the same ratio to the resistance $R_3$ that the resistance $R_1$ bears to the resistance $R_2$. In practice, when it is desired to determine the distance to a fault in a bad wire of a telephone line, the reactances of the bad wire and a good wire sometimes called its mate, are compared. If the length of the good wire is known, the distance to the fault in the bad wire may be readily calculated.

When it is necessary to energize the fixed coil F of the current detecting device with current having a potential different from that supplied to the diagonal of the bridge, the arrangement of Fig. 2 may be employed. In the arrangement of Fig. 2 the resistance and reactance components of any impedance have been schematically shown by reference characters $R_6$ and $C_2$. These components, $R_6$ and $C_2$, together form one arm of the Wheatstone bridge which is balanced by the arm of the Wheatstone bridge including resistance $R_3$ and condenser $C_1$. The potential for the bridge is obtained from a source $S_1$ which is connected through a resistance $R_7$ to the input brushes $B_9$ and $B_{10}$ of a commutator $K_1$. Two pairs of output brushes located 90 degrees apart are connected to the outer terminals of the switch W, these pairs including brushes $B_{11}$ and $B_{12}$, $B_{13}$ and $B_{14}$, respectively. On the same shaft with the commutator $K_1$ is another commutator $K_2$. The input brushes of this commutator are $B_{15}$ and $B_{16}$, which are connected to a source $S_2$ through a protective resistance $R_8$. The output brushes $B_{17}$ and $B_{18}$ are connected to the fixed coil F of the current detecting device.

This arrangement of commutators gives the same effect as if an alternating current were supplied to the fixed coil F having the same frequency as, but a different voltage from that supplied to the bridge. The shaft on which the commutators $K_1$ and $K_2$ revolve has means associated therewith for varying the angle that the output brushes, $B_{17}$ and $B_{18}$ of the commutator $K_2$ make with either pair of output brushes of the commutator $K_1$, for example, $B_{11}$ and $B_{12}$. Inasmuch as the operation of the arrangement shown in Fig. 2 is similar to that already described for Fig. 1, it need not here be repeated.

While the arrangements of this invention have been shown in two particular embodiments which are deemed desirable, it is to be understood that it is capable of embodiment in other and widely varied organizations without departing from the spirit of the invention and the scope of the appended claims.

What is claimed is:

1. In a system for measuring the resistance and reactance components of a telephone line, a Wheatstone bridge having the telephone line as one of its arms, an alternator having two pairs of output brushes in quadrature with each other, a galvanometer having a pair of mutually reactive windings, one of the windings of said galvanometer being in a diagonal of said bridge, means for supplying current to the other winding of said galvanometer which has a predetermined phase angle with the current derived from either pair of the output brushes of said alternator, and means for connecting one pair of the output brushes of said alternator to the other diagonal of the bridge so that the resistance component of the telephone line may be determined and for connecting the other pair of output brushes thereto so that the reactance component may be determined.

2. In a system for measuring the resistance and reactance components of a telephone line, a Wheatstone bridge having the telephone line as one arm thereof, an alternator having two pairs of output brushes arranged so as to supply currents to one diagonal of the Wheatstone bridge in quadrature with each other, a galvanometer having a pair of mutually reactive windings, one of said windings being movable and being connected to the other diagonal of the bridge, the first winding being fixed and being connected to the alternator so as to be supplied with current having a predetermined phase angle with respect to the current derived from either pair of the output brushes of said alternator, and means for connecting either pair of output brushes of said alternator to the first-mentioned diagonal of the bridge so that the resistance and reactance components of the telephone line may be separately balanced.

3. In a system for separately balancing the resistance and reactance components of a telephone line connected to one arm of a Wheatstone bridge, the combination of a galvanometer having two mutually reactive windings, one winding being excited by the current flowing in one diagonal of the bridge, a source of alternating current connected to the other diagonal of the bridge for supplying alternating current thereto and also current in quadrature therewith, and means for exciting the other winding of said galvanometer by current having a definite phase angle with the current supplied to the latter diagonal of the bridge.

4. In a system for separately balancing the resistance and reactance components of an electrical impedance connected so as to form one arm of an electrical bridge, the combination of a current detecting device having two mutually reactive windings, one of said windings being excited by the unbalanced current of the bridge, means for supplying alternating current to the bridge, means for supplying current in quadrature with said alternating current, and means for supplying the other winding of said current detecting device with current having a predetermined phase relationship with the current supplied to said bridge.

5. In an electrical bridge having a telephone line in one arm thereof and a fixed capacity and a variable resistance in another arm thereof, a source of alternating current of definite frequency, a source of current in quadrature therewith, means for connecting either of said sources of current across the bridge in one diagonal, and a current detecting device connected across the bridge in the other diagonal, and means whereby the resistance and reactance components of said telephone line may be independently determined.

6. In an electrical bridge having a telephone line in one arm thereof and a fixed capacity and a variable resistance in another arm thereof, the combination of a current detecting device comprising two mutually reactive windings, one of which is movable and the other stationary, an alternator having three pairs of output brushes, two pairs of which are in quadrature with each other, the third pair of brushes making predetermined angles with the other pairs of brushes and being connected to the stationary winding of said current detecting device, the movable winding of said current detecting device being connected in one diagonal of the bridge, and means for connecting either pair of output brushes in quadrature with each other to the other diagonal of the bridge so that the resistance and reactance components of said telephone line may be independently determined.

7. In a system for measuring the open circuit impedance of a telephone line, the combination of a source of alternating current, means for providing current in quadrature therewith, an indicating device comprising two current responsive elements which cooperate to produce indications thereon, an adjustable reactance, a fixed resistance, an adjustable resistance, means for interconnecting said telephone line, the adjustable reactance, the fixed resistance and the adjustable resistance so that when alternating current is applied the resistance adjustment on said indicating device will become sensitive and the reactance adjustment insensitive, and when current in quadrature therewith is applied the reactance adjustment on said indicating device will become sensitive and the resistance adjustment insensitive.

8. In a system for measuring the open circuit resistance and reactance components of a telephone line, the combination of a generator of alternating current and current in quadrature with said alternating current, an indicating device comprising two mutually reactive elements cooperating to produce indications thereon, an electrical bridge comprising the telephone line as a first arm, a fixed resistance as a second arm, an adjustable resistance as a third arm, and an adjustable resistance in series with a fixed capacity as a fourth arm, the indicating device being connected across the bridge in one diagonal, the alternating current being supplied to the bridge in the other diagonal so that the adjustable resistance of the third arm may be balanced against the fixed resistance of the second arm, current in quadrature therewith being supplied to the bridge so that the adjustable resistance in series with the fixed capacity of the fourth arm may be balanced against the telephone line of the first arm.

9. In an electrical bridge having a telephone line in one arm thereof, the combination of a commutator having two sets of output brushes thereon 90° apart, means for connecting either of said output brushes to the bridge in one diagonal, a current detecting device connected across the bridge in the other diagonal, and means whereby the resistance and reactance components of said telephone line may be separately determined.

10. In a system for separately determining the reactance and resistance components of a telephone line, the combination of a Wheatstone bridge having the telephone line in one arm thereof, a generator for generating currents in quadrature with each other and a current having a predetermined phase relationship with said currents in quadrature, means for applying either of the currents in quadrature to one diagonal of the bridge, and a current detecting device having two mutually reactive windings, one winding of said current detecting device being connected to the other diagonal of the bridge, and the other winding of said current detecting device being supplied with the current having the predetermined phase relationship with the currents in quadrature.

In testimony whereof, we have signed our names to this specification this 4th day of May, 1926.

PAUL G. EDWARDS.
HAROLD W. HERRINGTON.